United States Patent [19]
Jones, Jr.

[11] 3,815,473
[45] June 11, 1974

[54] VIBRATING APPARATUS
[75] Inventor: Clarence O. Jones, Jr., Eggertsville, N.Y.
[73] Assignee: Derrick Manufacturing Corporation, Cheektowaga, N.Y.
[22] Filed: Sept. 22, 1972
[21] Appl. No.: 291,154

[52] U.S. Cl............ 91/248, 91/275, 92/166, 209/363
[51] Int. Cl........................... F01l 25/08, F16j 15/18
[58] Field of Search............ 91/248, 275, 361; 60/9, 60/7 R; 185/29; 209/367, 363; 92/166

[56] References Cited
UNITED STATES PATENTS
| | | | |
|---|---|---|---|
| 2,211,000 | 8/1940 | Brown et al. | 209/368 |
| 2,886,009 | 5/1959 | Myers | 91/360 |
| 2,977,765 | 4/1961 | Fillmore | 91/248 |
| 3,266,233 | 8/1966 | Farrell | 60/7 R |
| 3,319,530 | 5/1967 | Sjorberg | 91/275 |
| 3,488,999 | 1/1970 | Catania | 91/275 |
| 3,502,273 | 3/1970 | West et al. | 91/275 |
| 3,651,635 | 3/1972 | Clay | 60/9 |

*Primary Examiner*—Edgar W. Geoghegan
*Assistant Examiner*—A. M. Zupcic

[57] ABSTRACT

Apparatus for screening material by mechanical vibration of a screen member which is mounted for limited reciprocable movement. A hydraulic cylinder is fixed to the screen with its axis extending in the direction of vibration of the screen and the piston member in the cylinder has weights thereon to develop substantial inertia forces upon reversal of operating hydraulic pressure to opposite ends of the cylinder. An electro hydraulic servo valve connects operating fluid pressure alternately to opposite ends of the cylinder and alternating current electrical means produces reciprocations of the servo valve whereby the piston member reciprocates at a frequency in synchronism with the frequency of the alternating current means.

17 Claims, 4 Drawing Figures

3,815,473

VIBRATING APPARATUS

BACKGROUND OF THE INVENTION

This invention relates to means for vibrating mechanical devices such as industrial screen apparatus and other material handling and conveying equipment such as vibratory conveyors.

In the prior art industrial screens are usually vibrated by inertia devices mounted on the screen frame and the inertia member or members comprise mechanically rotated eccentrics or the like. Screens may also be vibrated by direct mechanical connection with a reciprocating drive means.

In conventional screen vibrators of the rotating eccentric type the eccentric devices are mounted upon a shaft or shafts and the eccentric members develop large and rapidly reversing radial thrust forces on the shaft bearings. These forces are such as to greatly limit the velocity of the eccentrics and, even when thus limited, bearing wear presents an extreme problem.

SUMMARY OF THE INVENTION

In the present invention a mechanical inertia member is connected to or made as a part of the movable member of a hydraulic piston and cylinder combination and the movable member is reciprocated by rapid reversals of the fluid connections thereto under the control of an electromagnetically activated servo-valve. The electrical activation of the servo-valve may be by means of various pulsating signal generators or oscillators.

A particularly useful means for attaining the desired rapidly reversing fluid connections to the piston and cylinder motor means of the present invention comprises an electro-hydraulic servo-valve of the general type shown and described in Moog U.S. Pat. No. 2,767,689, dated Oct. 23, 1956. In this type of valve an electric torque motor has an armature movable in either direction depending on the polarity of the electrical connection thereto and by such movements controls a pilot pressure valve member which in turn transmits its reciprocations hydraulically to a reciprocating spool type valve which in effect amplifies the hydraulic signal of the pilot valve and supplies operating hydraulic pressure to the aforesaid piston and cylinder combination which includes the inertia member or members, the latter being thus reciprocated at a frequency equal to the frequency of the alternating current signal which energizes the torque motor of the servo-valve.

In this arrangement there are no lateral thrust loads on the bearing surfaces of the inertia motor since the movements and reversals are entirely in an axial direction. Furthermore, the frequency of reversal and the amplitude of movement of the movable member of the inertia motor are readily controlled and regulated in apparatus of the type disclosed therein.

DESCRIPTION OF THE ILLUSTRATED EMBODIMENTS

Figure 1:
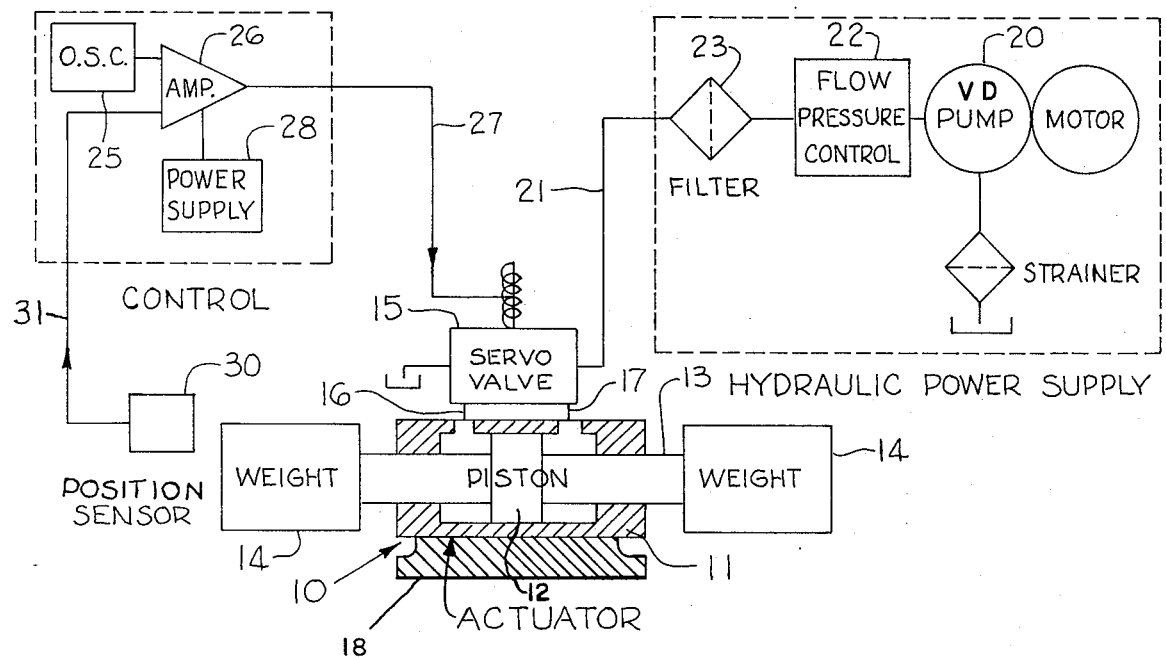
FIG. 1 is a general schematic view of one form of the apparatus of the present invention.

In FIG. 1 the numeral 10 designates generally an inertia motor which is adapted to be mounted directly upon a reciprocable screen structure which is vibrated thereby, the screen structure shown fragmentarily at 18 in FIG. 1. Screens of this class are mounted in various ways in a supporting framework to permit limited reciprocating movement thereof. The means for thus mounting the screen to its supporting structure is conventional and need not be illustrated or described herein. One such screen and mounting means is shown in Brown et al. U.S. Pat. No. 2,211,000 dated Aug. 13, 1940. Inertia means of the prior art involving eccentric rotating masses, for instance, are conventionally mounted directly upon the reciprocable screen structure.

As shown schematically in FIG. 1, the inertia motor comprises essentially a cylindrical housing 11, a piston 12 reciprocable therein, a mounting shaft 13 for the piston and weights 14 at opposite ends of shaft 12 to provide the desired reciprocating mass.

Reciprocating movement of piston 12 in housing 11 is provided hydraulically by means of an electro-hydraulic servo-valve designated 15 in FIG. 1 which is preferably of the general type shown and describe in Moog U.S. Pat. No. 2,767,680, dated Oct. 23, 1956. In such servo-valves, as fully described in the aforesaid patent, an electric torque motor is energized by alternating current impulses which rapidly oscillate a pilot valve element which in turn feeds alternating hydraulic pressure impulses to a main valve member. The main valve member has a pair of outlet passages which in the schematic showing of FIG. 1 are designated 16 and 17 and apply alternating opposite hydraulic pressure impulses to piston 12.

Hydraulic pressure supply for the servo-valve 15 is by means of a motor-driven pump 20 which leads to servo-valve 15 by way of a conduit 21 which includes a fluid pressure control valve 22 and a filter 23.

The alternating electrical current supply to the torque motor of the servo-valve 15 is shown schematically in FIG. 1 and includes essentially an oscillator 25, the output of which is connected to an adjustable amplifier 26 which in turn leads to the electro magnets of the torque motor of servo-valve 15 by way of a conductor 27. In FIG. 1 the numeral 28 designates the power supply to amplifier 26. Means are provided for keeping the piston 12 normally centered. In FIG. 1 the numeral 30 designates a position sensor which may comprise a linear variable differential transformer and which has a feed-back connection 31 to amplifier 26.

By this means the alternating current signal developed by the sensor 30 is superimposed upon the signal applied to the amplifier 26 by oscillator 25 and the resultant output signal from the amplifier will thus correct for any off-center condition which develops in the piston 12 and shaft 13 with respect to cylinder 10.

Where adjustment of the frequency of vibration of the screen is desired the requisite variation in the alternating frequency of motor 10 may be accomplished by adjustment of the frequency of oscillator 25. Adjustment of the amplitude of oscillation of piston 12 and weights 14 and consequent adjustment of the amplitude of oscillation of the associated screen may be attained by adjustment of the gain of amplifier 26 or by adjustment of the output fluid pressure of the hydraulic power supply by adjustment of pressure control valve 22.

Figure 3:
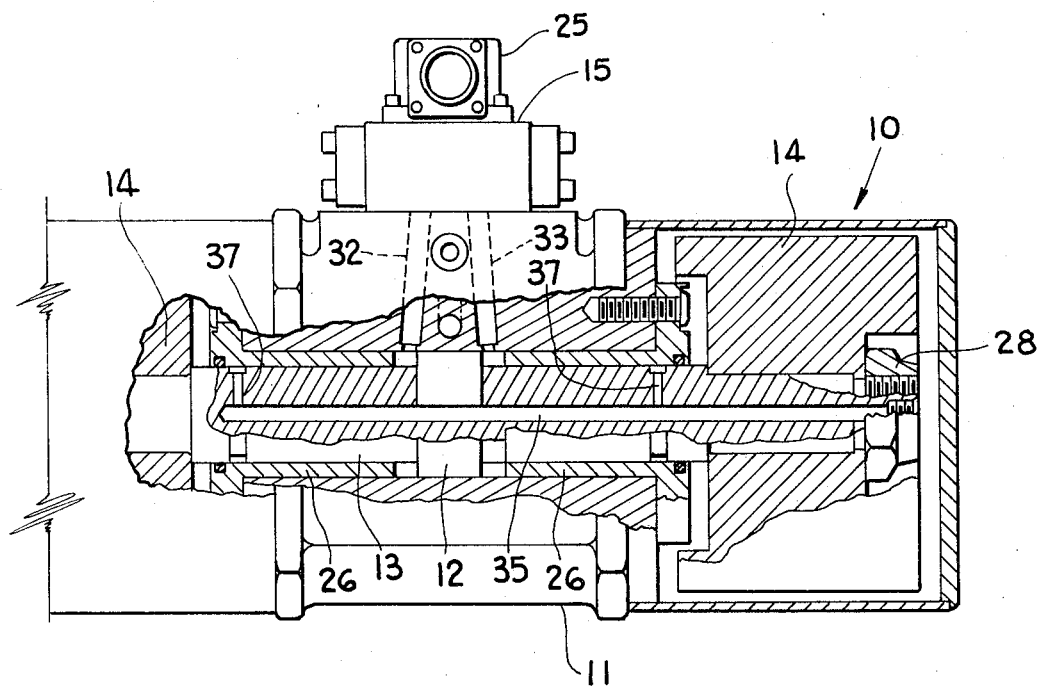
FIG. 3 is a general elevational view, partly in cross section, showing one form of the inertia motor illustrated schematically in FIG. 1.
Figure 4:
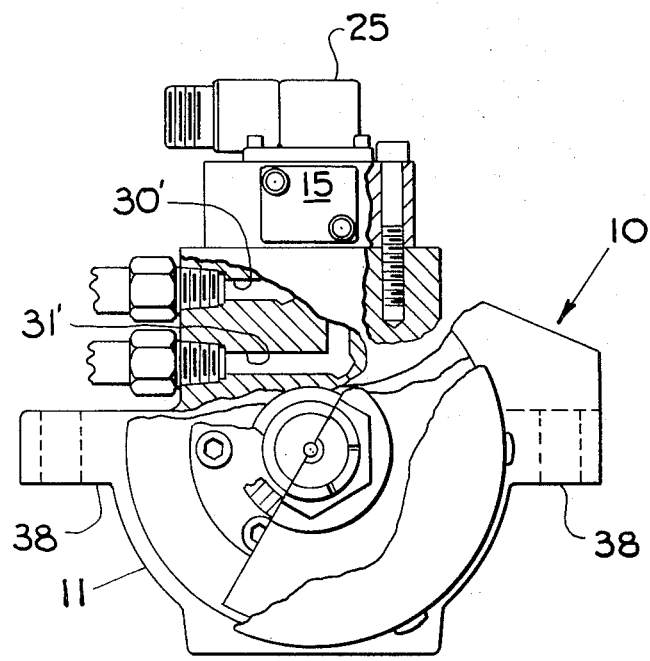
FIG. 4 is an end view of the structure of FIG. 3, likewise partly in cross-section.

Reference will now be had to FIGS. 3 and 4 which show the inertia motor 10 in somewhat greater detail. In FIG. 3 the servo-valve 15 is shown as having an electrical torque motor 25 associated therewith, this construction being substantially as shown in the aforesaid Moog U.S. Pat. No. 2,767,689. As shown in FIG. 3, shaft 13 has a central piston 12 formed directly thereon and shaft 13 is axially slidable in bearing sleeves 26 in cylindrical housing 11.

The weights 14 previously identified in connection with the schematic showing, FIG. 1, are disposed upon reduced end formations of shaft 13 and are retained by nuts such as at 28 in FIG. 3. In FIG. 4 the numerals 30' and 31' designate respectively hydraulic pressure supply and return passages which supply operating fluid pressure to servo-valve 15. The opposed output pressure passages from servo-valve 15 connect with hydraulic pressure passages 32 and 33 in cylindrical housing 11 and these latter passages are directed to the spaces at the opposite faces of piston 12, as clearly shown in FIG. 3. In FIG. 3 the shaft 13 is shown as having a central bore 35 which entrains leakage fluid which passes axially outwardly between shaft 13 and sleeves 26 and thence passes to bore 35 by means of transverse passages 37.

As shown in FIG. 4, cylindrical housing 11 is provided with support lugs or bracket formations 38 for mounting the inertia motor assembly on a screen structure, such mounting being otherwise the same as in the case of conventional inertia means of the prior art wherein rotating eccentric masses are employed.

Figure 2:
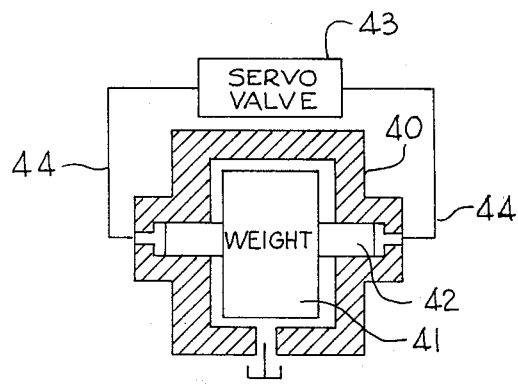
FIG. 2 is a partial diagrammatic view similar to FIG. 1 showing a modified form of inertia motor.

FIG. 2 illustrates schematically a modified inertia motor arrangement wherein a cylindrical housing 40 has a single central weight 41 supported therein on shaft extensions 42 which bear in housing 40. In this embodiment a servo-valve 43, otherwise the same as that of the preceding embodiment, has its output pressure passages connected by conduits 44 with the opposite ends of cylindrical housing 40 whereby the shaft extensions 42 serve as pistons for vibrating weight 41 in accordance with operation of servo-valve 43.

Preferred embodiments of the present invention have been described herein and shown in the accompanying drawings to illustrate the underlying principles of the invention but it is to be understood that numerous modifications may be made without departing from the broad spirit and scope of the invention.

I claim:

1. Screening apparatus including a screen mounted for limited reciprocating movement and means for vibrating the same comprising hydraulic piston and cylinder members, one of said members being fixed to said screen and the other being reciprocable relative thereto in an axial direction, said reciprocable member having weight means carried thereby to develop substantial inertia forces upon reversal of the direction of movement thereof, a source of hydraulic pressure fluid, an electro-hydraulic servo-valve adapted to direct said pressure fluid alternately to said cylinder at opposite sides of said piston, and alternating electric current means for actuating said servo-valve whereby said piston and cylinder members reverse their directions of relative movement in synchronism with said alternating current means.

2. Apparatus according to claim 1 wherein said servo-valve includes a four-way valve having a hydraulic pressure and discharge connections reversibly connectable with opposite ends of said cylinder member, a pilot valve for reciprocating said four-way valve, and an electric torque motor for moving said pilot valve alternately in opposite directions under the control of said alternating current means.

3. Apparatus according to claim 1 wherein said hydraulic pressure fluid source includes means for delivering fluid at constant pressure to said servo-valve for controlling the amplitude of movement of said reciprocable member.

4. Apparatus according to claim 3 wherein said constant pressure means is selectively adjustable.

5. Apparatus according to claim 1 wherein said alternating current means comprises an oscillator and an amplifier operatively connected between said oscillator and said servo-valve.

6. Apparatus according to claim 1 including means for adjusting the frequency of said alternating current means to vary the vibration frequency of said reciprocable member.

7. Apparatus according to claim 5 wherein the output frequency of said oscillator is adjustable to vary the vibration frequency of said servo-valve and said reciprocable member.

8. Apparatus according to claim 5 wherein the output magnitude of said amplifier is adjustable to vary the amplitude of movement of said reciprocable member.

9. Apparatus according to claim 2 wherein said hydraulic pressure fluid source includes means for delivering fluid at constant pressure to said servo-valve for controlling the amplitude of movement of said reciprocable member.

10. Apparatus according to claim 9 wherein said constant pressure means is selectively adjustable.

11. Apparatus according to claim 2 wherein said alternating current means comprises an oscillator and an amplifier operatively connected between said oscillator and said torque motor.

12. Apparatus according to claim 2 including means for adjusting the frequency of said alternating current means to vary the vibration frequency of said reciprocable member.

13. Apparatus according to claim 11 wherein the output frequency of said oscillator is adjustable to vary the vibration frequency of said servo-valve and said reciprocable member.

14. Apparatus according to claim 11 wherein the output magnitude of said amplifier is adjustable to vary the amplitude of movement of said reciprocable member.

15. Apparatus according to claim 1 wherein the fixed member of said piston and cylinder members is mounted on said screening apparatus.

16. Apparatus according to claim 2 wherein, the fixed member of said piston and cylinder members is mounted on said screening apparatus.

17. Apparatus according to claim 1 including an electrical sensor for indicating out-of-center conditions of said movable member in its reciprocation with respect to the fixed member, and feedback means for modifying said alternating current means to correct said out-of-center condition in response to out-of-center indications of said sensor.

* * * * *